April 15, 1924.
F. T. DOW
1,490,162
MACHINE FOR BRIQUETTING PEAT
Filed Nov. 28, 1919       2 Sheets-Sheet 1
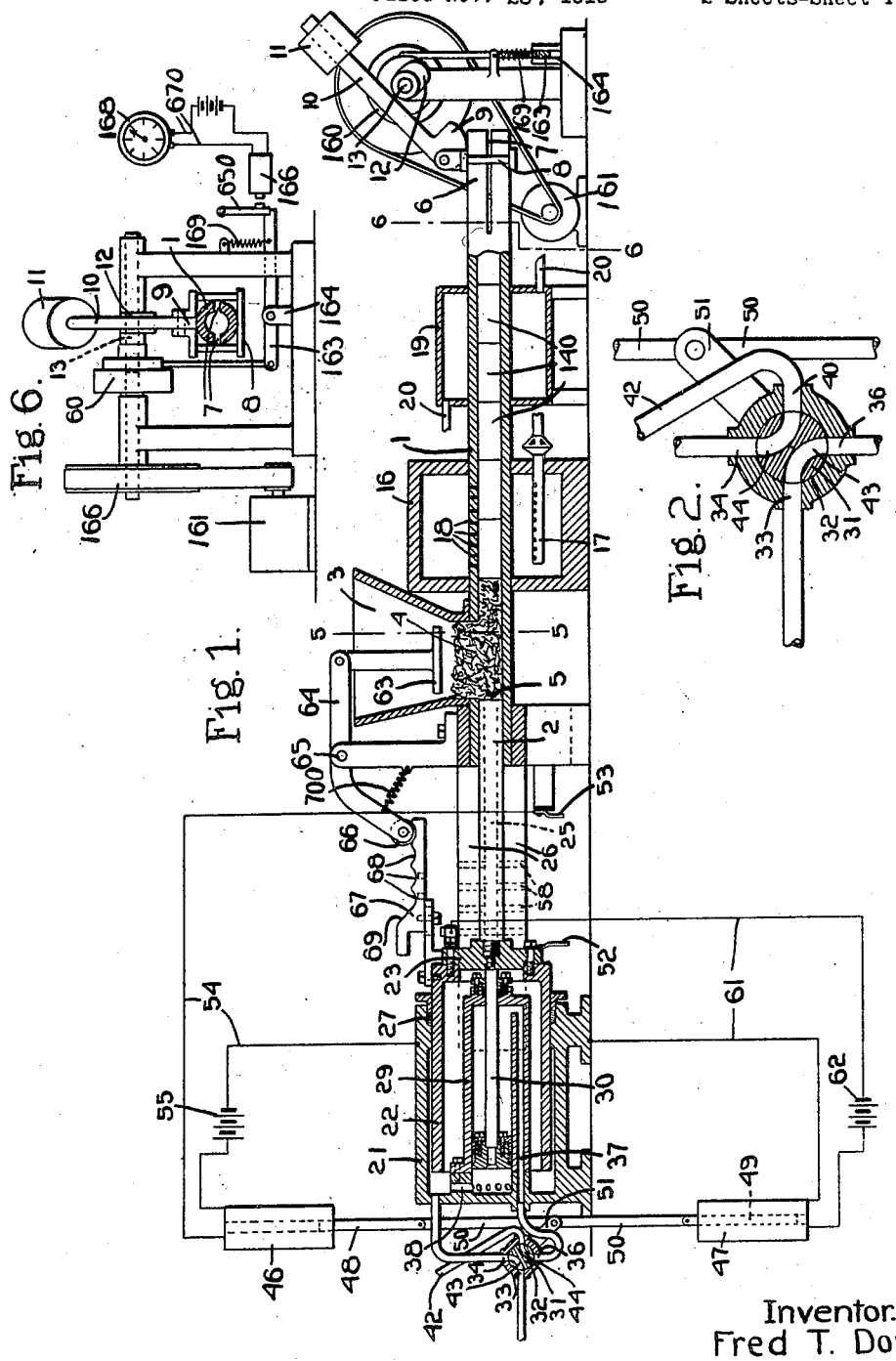
Inventor.
Fred T. Dow
by Heard Smith & Tennant.
Attys.

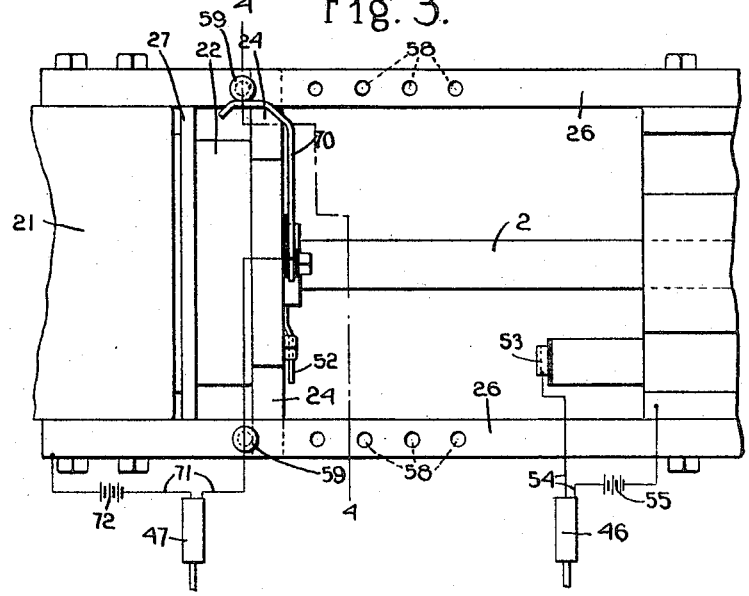
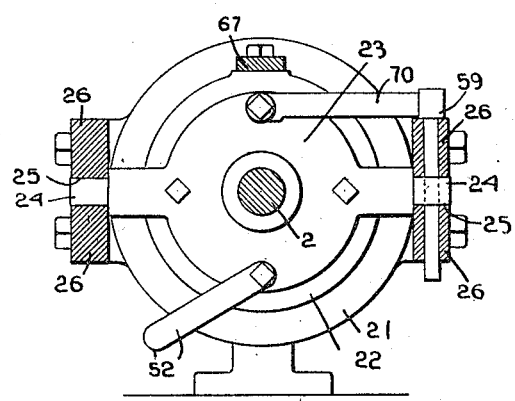
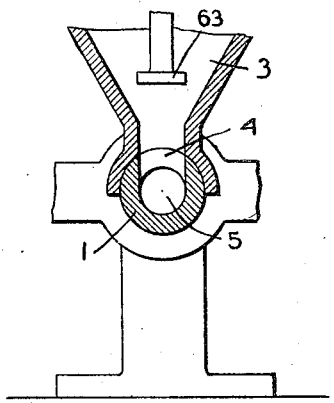

Patented Apr. 15, 1924.

1,490,162

UNITED STATES PATENT OFFICE.

FRED T. DOW, OF BANGOR, MAINE.

MACHINE FOR BRIQUETTING PEAT.

Application filed November 28, 1919. Serial No. 341,213.

*To all whom it may concern:*

Be it known that I, FRED T. Dow, a citizen of the United States, residing at Bangor, county of Penobscot, State of Maine, have invented an Improvement in Machines for Briquetting Peat, of which the following description, in connection with the accompanying drawing, is a specification, like characters on the drawing representing like parts.

This invention relates to machines for briquetting peat or similar material and has for its object to provide a novel machine of this type which operates to compress each charge of peat into briquet formation and retain the pressure thereon for a predetermined length of time, and at the same time to subject said compressed mass of peat to heat thereby to soften any binding ingredient in the peat so as to render such binding material active in binding the particles of the briquet together.

In order to give an understanding of my invention, I have illustrated in the drawings a selected embodiment thereof which will now be described, after which the novel features will be pointed out in the appended claims.

Fig. 1 of the drawings is a sectional view of an apparatus embodying my invention;

Fig. 2 is an enlarged sectional view showing a valve which may be used for controlling the hydraulic press;

Fig. 3 is an enlarged plan view of part of the press;

Fig. 4 is a section on the line 4—4, Fig. 3;

Fig. 5 is an enlarged section on the line 5—5, Fig. 1.

Fig. 6 is a section on the line 6—6, Fig. 1.

My improved press comprises a tubular matrix member 1 into which charges of peat or similar material may be placed, a plunger 2 reciprocable in said matrix and operating to take each charge of peat or other material and force the same into the matrix, and means to maintain each charge under pressure for a predetermined length of time and at the same time to subject said charge to the action of heat.

The matrix element 1 is preferably of considerable length and is adapted to contain a plurality of separate charges or briquets in series. Associated with the matrix element 1 is a hopper 3 into which the peat or other substance is delivered, and this hopper has communication with the matrix through an opening 4. The plunger 2 is preferably actuated by hydraulic pressure and is constructed so that when it is in its retracted position the end 5 thereof has uncovered the opening 4 so that material in the hopper will enter the matrix 1 through said opening. When the plunger moves forwardly the material in front thereof is forced into the body of the matrix and is placed under compression.

I have herein provided a time mechanism which controls the length of time each charge or briquet is maintained under pressure, and while various devices for this purpose may be used, I prefer that herein shown. The delivery end 6 of the matrix element is split longitudinally, as shown at 7, thus allowing said end to be expanded slightly or contracted. This split end is encircled by a yoke 8 in which is pivoted a cam 9 arranged so that when the cam is turned in one direction it will force the two sides of the split end 6 toward each other, thus reducing the interior of the diameter of the tubular matrix member. Suitable automatically-operative means are employed for normally holding the cam in operative position to maintain the diameter of the tubular matrix slightly contracted, and a suitable time mechanism employed for moving the cam in the opposite direction to relieve the clamping pressure on the tube and thus allow the delivery end of the matrix to expand. One simple construction for this purpose comprises a weighted lever 10 connected to the cam 9, the weight 11 of which tends normally to maintain the cam in its operative clamping position. The clamping pressure is relieved periodically by means of a cam 12 carried by a rotatable shaft 13 and adapted in its rotation to raise the lever 10 and thus turn the cam 9. The shaft 13 may be operated by any suitable time mechanism which will cause the cam to relieve the clamping pressure at predetermined time intervals.

When the cam 9 is in operative clamping position the delivery end of the tubular matrix will be contracted to such an extent that the briquets 140 therein will not be delivered therefrom and hence when the plunger 2 is acted on by hydraulic pressure it will simply subject the briquets in the tube to a heavy pressure and will maintain the pressure thereon until the cam 12 is rotated to lift the lever and release the clamping pressure. When this occurs the resistance to the pressure of the plunger is reduced sufficiently to permit the plunger to make its full forward stroke, thus forcing the end briquet out through the delivery end of the tube 1 and advancing all the briquets in the tube one step. The plunger is then retracted into the position shown in Fig. 1, and a fresh charge of peat or other material is introduced through the opening 4, and the plunger will then make a forward stroke, thus placing the freshly-introduced material under pressure. The operation of the cam 12 is such that as soon as the plunger has completed its forward stroke and then has returned to take a fresh charge, said cam will allow the lever 10 to fall again thus to apply the clamping pressure on the end of the tube, and as a result when the plunger makes its next forward movement, the previously-formed briquets 140 will be locked in the tube 1 so that the plunger can only move as far forward as permitted by the compression of the fresh charge of material. The plunger will remain in this position subjecting this charge of material to the pressure until the cam 12 makes another rotation and relieves the clamping pressure on the split end 6 of the tube 1, at which time the plunger will complete its forward movement and advance all of the briquets one step forward.

Fig. 6 shows one form of time mechanism which may be used for controlling the cam 12. The cam is loosely mounted on the shaft 13 and is arranged to be clutched thereto by means of a clutch indicated generally at 160. The shaft is driven from a motor 161 by means of a suitable belt connection. The clutch 160 is in the nature of a one-revolution clutch and is actuated by a clutch actuating lever 163 pivoted at 164, said lever being held inoperative by a latch 650. The latch in turn is adapted to be released by a magnet 166 which is connected in a circuit 670 that is closed periodically by means of a suitable clock mechanism or time device 168. When the circuit is thus momentarily closed, the latch 650 is withdrawn, thus allowing the spring 169 to throw the clutch into operation and clutch the cam 12 to the shaft. The cam will then make one revolution and come to rest, and at the next predetermined time interval this operation will be repeated.

I have provided means for heating each briquet as it is being formed and while it is subjected to pressure by the plunger 2, and for this purpose I provide for heating the portion of the matrix tube 1 immediately adjacent the opening 4. This can be done by placing a heating chamber 16 around the tube and providing for heating said chamber by any suitable means, as, for instance, a gas burner 17. This chamber is so situated that as each briquet is being formed and is subjected to pressure by the plunger, it will be pushed into the heated portion of the matrix tube and thus will be subjected to heat at the time that it is also subjected to pressure.

The heat thus developed will be sufficient to soften any binder which is contained in the peat so that said binder will become operative to bind the particles together and make a firm and hard briquet. If the peat has moisture in it the heating of the compressed peat evaporates the moisture, and in order to allow the moisture to escape I provide the heated portion of the matrix tube with a plurality of vent apertures 18 so that any steam which is formed during the heating of the peat may escape through the apertures.

After the peat has been heated and has been compressed while in a heated state thereby to render the binding agency active, it is desirable to cool the peat and thereby harden it. For this purpose, I propose to provide means for cooling the portion of the matrix tube between the heated portion and the delivery end, and while this can be done in any appropriate way, I have herein shown for this purpose a jacket 19 surrounding the matrix 1 through which a stream of cooling water may be passed by means of circulating pipes 20. Since the briquets are being advanced through the tube 1 with a step-by-step movement, each briquet will be retained in the cooled portion of the matrix tube for a sufficient length of time to cool it so that when the briquets are delivered from the matrix, they will be perfectly hard and firm.

While any suitable means may be employed for applying pressure to the briquets through the plunger 2, I will preferably use a device in the nature of a hydraulic press which is so arranged that after the plunger has been retracted, it will apply a continuous pressure thereto, thereby compressing the briquet, and this pressure will be maintained until the time mechanism releases the clamping cam 9 and allows all of the briquets in the matrix 1 to be moved forward. This forward movement is accomplished by the continued forward pressure of the hydraulic device on the plunger 2. The device is also arranged so that as soon as the plunger has completed its forward movement it will be automatically retracted to its rearward position to allow another charge of peat to fill the tube in front of the plunger, and then the plunger will be automatically moved forward again to compress this new charge and maintain it under pressure until the clamping cam 9 is released again.

As illustrating one convenient hydraulic mechanism for accomplishing this purpose I have shown a device comprising a cylinder 21 open at one end and a piston element 22 operating through the open end of the cylinder, said piston element being provided with a head 23 to which the plunger 2 is connected. This head 23 is provided with arms 24 which are guided in slots 25 formed in guide rails 26. The piston element 22 is cup-shaped and it operates through a packing box 27 thereby making a tight joint with the cylinder. When pressure is admitted to the left-hand end of the cylinder, it will act against the head 23 of the piston element and will thus move said element toward the right, Fig. 1.

Inasmuch as the compressing of the briquet is accomplished during the movement of the plunger 2 to the right and the movement of the plunger to the left requires the expenditure of comparatively little force, I have provided herein a supplementary piston and cylinder for returning the plunger to normal position, the operation of which requires the use of considerably less water than the operation of the main piston and cylinder. This supplementary piston is indicated at 28 and it operates in a small cylinder 29 situated within the piston element 22. The supplementary piston 28 is connected by a piston rod 30 to the head 23, said piston rod extending through the end of the cylinder 29. Means are provided whereby both the pistons 22 and 28 are subjected to hydraulic pressure during the compressing of the briquet, and the supplementary piston 28 only is utilized in returning the plunger 2 to its normal position. The admission of the motive fluid to the piston may be controlled by any suitable valve mechanism.

I have shown in Figs. 1 and 2 a four-way valve in the form of a valve plug 31 operating in a valve casing 32. This valve casing has an inlet port 33 through which the motive fluid is admitted and it has one outlet port 34 leading into the cylinder 21, and another port 36 communicating with a duct 37 that leads into the right-hand end of the cylinder 29. The left-hand end of said cylinder 29 communicates with the left-hand end of the cylinder 21 through suitable ports 38. The valve casing is also provided with an exhaust port 40 with which the exhaust pipe 42 has communication. The valve plug 31 is provided with two ports 43 and 44.

When the valve is in the position shown in Fig. 1, the inlet port 33 communicates with the port 34 through the valve plug port 43 so that water under pressure is admitted to the left-hand end of the cylinder 21 and through the ports 38 to the left-hand end of the cylinder 29. Both pistons 22 and 28 are thus subjected to the pressure of the water. When the valve plug is in this position the duct 37 leading to the right-hand end of the cylinder 29 communicates with the exhaust port 40 through the valve plug port 44, and, therefore, the water is allowed to exhaust from the right-hand end of the cylinder 29 as the piston moves toward the right. When the valve is turned into the position shown in Fig. 2, then the right-hand end of the cylinder 29 has communication with the inlet port 33 through the valve plug port 43, and the left-hand end of the cylinders 21 and 29 communicate with the exhaust pipe 42 through the ports 34, 44 and 40. The water pressure is thus admitted to the right-hand side of the piston 28 and the plunger 2 will thereby be retracted. The amount of water which is required in the cylinder 29 to retract the piston 28 is, of course, very much less than that required in moving the two pistons forward, and hence a saving in the amount of water used is effected.

I have provided means for automatically shifting the valve plug 31 when the plunger reaches each end of its stroke, and while any structure for accomplishing this may be employed, I have illustrated herein a device comprising two solenoids 46 and 47, the cores 48 and 49 of which are connected to the valve through a connection 50 which is in turn connected to an arm 51 extending from the valve plug. When the solenoid 46 is energized the valve will be turned into the position shown in Fig. 2 and when the solenoid 47 is energized the valve will be turned into the position shown in Fig. 1.

Means are provided for causing the energization of the solenoid 46 whenever the plunger 2 reaches the limit of its movement to the right and the energization of the solenoid 47 when the plunger reaches the limit of its movement to the left. The head 23 is shown as provided with a contact 52 which is adapted to engage an insulated contact 53 when the head completes its movement to the right. The contact 53 is connected by a wire 54 to a battery 55 and the solenoid 46, said wire being grounded on the frame. When, therefore, the plunger completes its movement to the right, the circuit through the solenoid 46 will be closed by the closing of the contacts 52 and 53, and, as stated above, the energizing of the solenoid 46 will shift the valve 31 so as to cause the plunger to be retracted.

The frame 26 is provided with a plurality of holes 58 in any one of which may be inserted a stop pin 59. The cross head 23 carries an insulated contact member 70 which is adapted to engage the stop pin 59 as the piston 22 moves rearwardly. This contact 70 is connected by a circuit 71 to the solenoid 47, said circuit having a battery or other source of electrical supply 72 therein and being connected to the pins 59. The contact 70 is constructed so that it will engage the pin 59 just before the arm 24 of the cross head and thus during the rearward movement of the piston 22 the solenoid 47 will be actuated to reverse the valve 31 whenever the contact 70 comes into engagement with the pin 59. By placing the pin 59 in any one of the holes 58 the extent to which the piston 22 moves rearwardly, and consequently the length of the stroke of the plunger 2, can be determined and adjusted.

If a large briquet is desired, the pin 59 will be put in the extreme hole to the left, thus allowing the plunger 2 to have its full stroke. If a shorter or smaller briquet is desired, then the pin 59 can be put in some one of the other holes 58.

I have also provided means for feeding the material to be compressed through the opening 4. Such means is herein illustrated as a feed plunger 63 operating in the hopper 3 and connected to a lever 64 pivoted at 65. The end of the lever is provided with a roll 66 which rests on an arm 67 adjustably carried by the head 23, said arm having a sinuous surface 68 terminating in a cam portion 69. 700 is a spring acting on the arm and tending to keep the roll in contact with the arm 67. As the plunger moves forwardly, the sinuous surface 68 will give the lever 64 a vibrating movement, thus moving the plunger 63 up and down, such movement acting to assist in feeding material through the opening 4 and also acting to prevent the material from being crowded out through said opening by the forward movement of the plunger. The cam surface 69 is situated so that it will act on the lever 64 just as the end of the plunger is closing the opening 4, and as at this time the peat or other material is being placed under considerable pressure, the downward movement of the plunger 63 due to the cam surface 69 will help to press the material and confine it in front of the plunger 2 until the plunger has moved beyond the opening 4.

In using the machine described herein the water or other fluid which actuates the plunger 2 is of such a pressure that when the delivery end 6 of the matrix element is contracted the plunger does not exert force enough on the newly formed briquet to push a finished briquet from the contracted end of the matrix member. It is only when the time mechanism has operated to release the clamping pressure and permit the expansion of the delivery end of the matrix element that the plunger 2 is permitted to force the series of finished briquets 140 to the right through the matrix element. Thus when the time element operates to permit the expansion of the right-hand end of the matrix element the plunger 2 under the pressure of the water on the cylinder 21 moves the entire line of briquets toward the right and expels a finished briquet from the end 6 of the matrix element. In doing this, the piston head 22 moves far enough to the right to make contact between the contacts 52 and 53 with the result that the solenoid 46 is actuated to shift the valve 31 so as to cause the plunger to be retracted.

As the plunger is being retracted more of the peat material falls through the opening 4 in a position to be compressed into the left-hand end of the matrix member when the plunger again moves to the right. When the plunger has moved a predetermined distance toward its retracted position at the left, depending upon the position of the stop pin 59, the solenoid 47 is actuated to shift the valve 31 so as to cause the plunger to again move toward the right. The plunger moves toward the right compressing the loose peat material until the material is compressed to such an extent that it exerts a force on the plunger equal to the force which the water within the cylinder 21 exerts on the piston head 22. The plunger will then remain in this position pressing against the newly formed briquet until the time mechanism permits the right-hand end 6 of the matrix member to open and a finished briquet be expelled and the entire line of briquets to move one position toward the right. Thus the time mechanism controls the length of time the briquet is maintained under pressure and, by means of briquets in the matrix member, the time mechanism is operatively connected but not mechanically connected to the plunger mechanism. It will readily be seen that the time mechanism is thus independent of the plunger mechanism but the plunger mechanism is more or less controlled by the time mechanism. The pressure of the water or other fluid which actuates the plunger is the same at all times and thus the plunger operates under a constant pressure but the pressure is not enough to make the plunger complete its stroke unless permitted to do so by the time mechanism. For the successful operation of the machine it is, therefore, necessary that the pressure of the water or other fluid be so regulated that the plunger will force briquets through the matrix when the right-hand end of the matrix is relieved of the clamping pressure but not such that the plunger will force the briquets through the matrix when the right-hand end of the matrix is contracted.

I claim:

1. In a briquetting machine, the combination with means for compressing a briquet, and time mechanism independent of the compressing means for controlling the length of time the briquet is maintained under pressure.

2. In a briquetting machine, the combination with a matrix member, of a plunger operable therein, means to apply pressure to the plunger, and time mechanism independent of the plunger for controlling automatically the length of time the pressure is applied.

3. In a briquetting machine, the combination with a matrix open at both ends, one of which is constructed to receive the material to be compressed and the other of which is the delivery end, of a plunger operating in the first-named end to compress into a briquet material delivered to the matrix and force the briquet through the matrix, and time mechanism independent of other parts of the machine to control the delivery of briquets from the matrix.

4. In a briquetting machine, the combination with a matrix open at both ends, one of which is constructed to receive the material to be compressed and the other of which is the delivery end, of a plunger operating in the first-named end to compress into a briquet material delivered to the matrix and force the briquet through the matrix, and time mechanism at the delivery end of the matrix operable independently of the plunger to control the delivery of briquets therefrom.

5. In a briquetting machine, the combination with a matrix open at both ends, one of which is constructed to receive the material to be compressed and the other of which is the delivery end, of a plunger operating in the first-named end to compress into a briquet material delivered to the matrix, and independently operable means at the delivery end of the matrix to control the time of the delivery of briquets therefrom.

6. In a briquetting machine, the combination with an elongated tubular matrix open at both ends, of means to deliver material to be briqueted to one end of said matrix, a plunger operating in said end of the matrix to form said material into briquets, the opposite end of said matrix being contractible, and means operable independently of other parts of the machine to contract said end periodically.

7. In a briquetting machine, the combination with an elongated tubular matrix open at both ends, of means to deliver material to be briqueted to one end of said matrix, a plunger operating under constant pressure in said end of the matrix to form said material into briquets, the opposite end of said matrix being contractible, a clamp for contracting said end, and time mechanism for actuating said clamp.

8. In a briquetting machine, the combination with an elongated tubular matrix open at both ends, of means to deliver material to be briqueted to one end of said matrix, a plunger operating under constant pressure in said end of the matrix to form said material into briquets, the opposite end of said matrix being slit, and time mechanism for periodically contracting said slit end of the matrix.

9. In a briquetting machine, the combination with an elongated tubular matrix open at both ends, of means to deliver material to be briqueted to one end of said matrix, a plunger operating in said end of the matrix to form said material into briquets, constant pressure means to operate said plunger thereby to subject the material in the matrix to pressure, and time mechanism for controlling the time during which the pressure is applied.

10. In a briquetting machine, the combination with an elongated, tubular matrix having an inlet opening in one end, of a reciprocating plunger operable in said matrix and adapted by its forward movement to compress material delivered through said inlet opening into a briquet and to move previously-formed briquets forward one step in said matrix, means to heat a portion of the matrix adjacent the inlet opening, means to cool a portion of the matrix further on, and means operable independently of other parts of the machine for periodically contracting the matrix at a point beyond the cooling station.

11. In a briquetting machine, the combination with an elongated, tubular matrix having an inlet opening in one end, of a reciprocating plunger operable in said matrix and adapted by its forward movement to compress material delivered through said inlet opening into a briquet and to move previously-formed briquets forward one step in said matrix, means to heat the portion of the matrix in which each briquet is left by the forward movement of the plunger, means to cool a portion of the matrix beyond, and means operable independently of other parts of the machine for periodically contracting the matrix at a point beyond the cooling station.

12. In a briquetting machine, the combination with an elongated, tubular matrix having an inlet opening in one end, of a reciprocating plunger operable in said matrix and adapted by its forward movement to compress material delivered through said inlet opening into a briquet and to move previously-formed briquets forward one step in said matrix, means to heat the portion of the matrix in which each briquet is left by the forward movement of the plunger, means to cool a portion of the matrix beyond, said heated portion of the matrix being provided with vent openings, and means operable independently of other parts of the machine for periodically contracting the matrix at a point beyond the cooling station.

13. In a briquetting machine, the combination with a tubular matrix having an inlet opening in one end, of a reciprocating plunger operating in said end, a hopper communicating with said inlet opening, a feeding plunger operating with a vibratory motion in the hopper, and means for giving movement to the feeding plunger by the movement of the first-named plunger.

14. In a briquetting machine, the combination with a tubular matrix having an inlet opening in one end, of a reciprocating plunger operating in said end, a hopper communicating with said inlet opening, and a feeding plunger operating with a vibratory motion in said hopper and actuated by the first-named plunger.

15. In a briquetting machine, the combination with a matrix, of a reciprocating plunger communicating therewith, a cylinder, a piston therein connected to the plunger, automatic adjustable means for controlling the reciprocation of the piston and by which the length of the stroke of the piston can be regulated thereby to regulate the size of the briquets.

16. In a briquetting machine, the combination with a tubular matrix having an inlet opening in one end, of a reciprocating plunger operating in said end, a hopper communicating with said inlet opening, a feeding plunger operating in the hopper, and means actuated by the first-named plunger to give the feeding plunger a vibratory motion during the compressing stroke of the first-named plunger.

17. In a briquetting machine the combination with a matrix member, of a plunger operable therein, means to apply a constant pressure to the plunger, and time mechanism independent of the plunger for controlling the length of time the pressure is applied.

18. In a briquetting machine the combination with a matrix open at both ends, one of which is constructed to receive the material to be compressed and the other of which is the delivery end, of a plunger operating under a constant pressure in the first-named end to compress into a briquet material delivered to the matrix and force the briquet through the matrix, and time mechanism independent of the plunger to control the delivery of the briquet from the matrix.

19. In a briquetting machine the combination with an elongated tubular matrix open at both ends, of means to deliver material to be briqueted to one end of said matrix, a plunger operating under a constant pressure in said end of the matrix to form said material into a briquet, the opposite end of said matrix being contractable, and independently operable time controlled means to contract said end periodically.

20. In a briquetting machine the combination of constant pressure means for compressing a briquet, and a time mechanism for controlling the length of time the briquet is maintained under pressure.

21. In a briquetting machine, the combination with a matrix open at both ends, one of which is constructed to receive the material to be compressed and the other of which is the delivery end, of a plunger operating under constant pressure in the first-named end to compress into a briquet material delivered to the matrix and to force the briquet through the matrix, and a time mechanism to control the length of time the briquet is maintained under pressure and to control the delivery of briquets from the matrix.

22. In a briquetting machine, the combination with a matrix open at both ends, one of which is constructed to receive the material to be compressed and the other of which is the delivery end, of a plunger having a definite stroke and operating under constant pressure in the first-named end for the full stroke to compress into a briquet material delivered to the matrix and to force the briquet through the matrix, and a time mechanism to control the length of time the briquet is maintained under pressure and to control the delivery of briquets from the matrix.

23. In a briquetting machine, the combination with a matrix open at both ends, one of which is constructed to receive the material to be compressed and the other of which is the delivery end, of a plunger operating in the first-named end to compress into a briquet material delivered to the matrix and force the briquet through the matrix, and time mechanism controlling the delivery of briquets from the matrix thereby controlling the movement of the plunger to regulate the length of time the briquet is compressed.

24. In a briquetting machine, the combination with a matrix open at both ends, one of which is constructed to receive the material to be compressed and the other of which is the delivery end, of a plunger having a definite stroke and operating under a constant pressure in the first-named end for the full stroke to compress into a briquet material delivered to the matrix and force the briquet through the matrix, and time mechanism controlling the delivery of briquets from the matrix thereby controlling the movement of the plunger to regulate the length of time the briquet is compressed.

25. In a briquetting machine, the combination with a matrix open at both ends, one of which is constructed to receive the material to be compressed and the other of which is the delivery end, of a plunger operating in the first-named end to compress into a briquet material delivered to the matrix and to deliver the compressed briquet, and means at the delivery end of the matrix for controlling the time of the delivery of the briquet from the matrix thereby controlling the movement of the plunger to regulate the length of time the briquet is compressed.

In testimony whereof, I have signed my name to this specification.

FRED T. DOW.